(12) United States Patent
Koike et al.

(10) Patent No.: US 8,166,409 B2
(45) Date of Patent: Apr. 24, 2012

(54) IMAGE PROCESSING METHOD AND IMAGE PROCESSOR FOR TRIMMING AN OBJECT IMAGE

(75) Inventors: Shinya Koike, Nagano-ken (JP);
Katsuyuki Takada, Nagano-ken (JP);
Toshiaki Oishi, Nagano-ken (JP);
Mikiya Shimada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1053 days.

(21) Appl. No.: 11/221,858

(22) Filed: Sep. 9, 2005

(65) Prior Publication Data

US 2006/0072174 A1   Apr. 6, 2006

(30) Foreign Application Priority Data

Sep. 14, 2004  (JP) .................. 2004-267141

(51) Int. Cl.
*G06F 3/048* (2006.01)

(52) U.S. Cl. ........ 715/764; 715/725; 715/800; 715/801; 715/815; 345/619; 345/660; 345/661; 345/662; 345/663; 345/665; 382/293; 382/298

(58) Field of Classification Search .................. 345/619, 345/660, 661, 662, 663, 665; 382/293, 298; 715/725, 800, 801, 815, 764
See application file for complete search history.

(56) References Cited

U.S. PATENT DOCUMENTS

| | | | |
|---|---|---|---|
| 4,701,044 A * | 10/1987 | Horiuchi et al. ................ 399/7 |
| 4,907,095 A * | 3/1990 | Komura et al. ............. 358/451 |
| 5,121,162 A * | 6/1992 | Iwamoto ...................... 399/82 |
| 5,430,832 A * | 7/1995 | Imaizumi et al. ........... 345/620 |
| 5,459,586 A * | 10/1995 | Nagasato et al. ............ 358/450 |
| 5,490,246 A * | 2/1996 | Brotsky et al. .............. 715/763 |
| 5,566,004 A * | 10/1996 | Imaizumi et al. ........... 358/450 |
| 5,666,471 A * | 9/1997 | Fujii ......................... 358/1.18 |
| 5,794,104 A * | 8/1998 | Maruyama ................. 399/183 |
| 5,936,862 A * | 8/1999 | Wong ......................... 700/117 |
| 6,111,586 A * | 8/2000 | Ikeda et al. ................. 345/619 |
| 6,285,461 B1 * | 9/2001 | Fujii et al. .................. 358/1.18 |
| 6,450,090 B1 * | 9/2002 | Wridge, Jr. .................. 101/40 |
| 6,940,526 B2 * | 9/2005 | Noda et al. ................. 345/629 |
| 6,964,025 B2 * | 11/2005 | Angiulo et al. ............. 715/838 |
| 7,010,176 B2 * | 3/2006 | Kusunoki .................... 382/299 |
| 7,209,149 B2 * | 4/2007 | Jogo .......................... 345/622 |

(Continued)

FOREIGN PATENT DOCUMENTS

JP  2001-346031 A  12/2001

*Primary Examiner* — Tadeese Hailu
*Assistant Examiner* — Patrick Riegler
(74) *Attorney, Agent, or Firm* — Sughrue Mion, PLLC (57) ABSTRACT

In a client, a photo frame for which guidelines have been set at predetermined positions based on an operator's setting operation is provided as a trimming frame TF with guidelines. While the trimming frame TF with guidelines is displayed on a processing object image in an overlapping manner, the trimming frame TF with guidelines is shifted and displayed on the processing object image based on the operator's shifting operation as well as the trimming frame TF with guidelines is enlarged or contracted and displayed so as to become a similar form based on the operator's enlarging or contracting operation. The operator can thus shift and enlarge or contract the trimming frame TF with guidelines so that the guidelines set by him/herself and a target contained in the processing object image have a desirable positional relationship.

10 Claims, 9 Drawing Sheets

U.S. PATENT DOCUMENTS

| | | | |
|---|---|---|---|
| 7,286,161 B2* | 10/2007 | Watanabe et al. | 348/207.2 |
| 7,317,815 B2* | 1/2008 | Steinberg et al. | 382/118 |
| 7,360,157 B1* | 4/2008 | Yalovsky | 715/256 |
| 7,454,707 B2* | 11/2008 | Matsumoto | 715/725 |
| 2001/0032248 A1* | 10/2001 | Krafchin | 709/206 |
| 2001/0048447 A1* | 12/2001 | Jogo | 345/620 |
| 2003/0086706 A1* | 5/2003 | Kinjo | 396/420 |
| 2003/0103234 A1* | 6/2003 | Takabayashi et al. | 358/1.15 |
| 2003/0112254 A1* | 6/2003 | Ishihara | 345/620 |
| 2003/0156197 A1* | 8/2003 | Watanabe et al. | 348/207.2 |
| 2003/0167447 A1* | 9/2003 | Hatta et al. | 715/517 |
| 2004/0070626 A1* | 4/2004 | Matsumoto | 345/788 |
| 2004/0229646 A1* | 11/2004 | Cho | 455/556.1 |
| 2005/0104897 A1* | 5/2005 | Walker et al. | 345/620 |
| 2006/0087700 A1* | 4/2006 | Kishi | 358/453 |
| 2006/0203107 A1* | 9/2006 | Steinberg et al. | 348/239 |

* cited by examiner

IMAGE PROCESSING METHOD AND IMAGE PROCESSOR FOR TRIMMING AN OBJECT IMAGE

BACKGROUND OF THE INVENTION

1. Field of the Invention

The present invention relates to an image processing method and an image processor. Specifically, the invention relates to an image processing method and an image processor that are capable of processing for trimming away a processing object image by use of a trimming frame.

2. Description of the Prior Art

Priorly, image processors for carrying out a process for trimming away a processing object image displayed on a display by a trimming frame have been known. For example, Japanese Published Unexamined Patent Application No. 2001-346031 discloses a device for, after providing a setting so that a reference point for positioning at the vertex of a person, a first horizontal line through this reference point, a second horizontal line drawn at a position to have a predetermined dimension ratio from this first horizontal line, and a vertical line vertically drawn from the reference point to the second horizontal line are displayed within a trimming frame having a form similar to an external form of a frame in a template image, carrying out a process for trimming away an image by use of this trimming frame. Concretely, an operator shifts the trimming frame on a portrait image to position the reference point at the vertex of a person, and then shifts the second horizontal line to a chin position of the person without moving the reference point. Hereupon, the trimming frame is enlarged or contracted in an interlocking manner with a shift of the second horizontal line around the reference point as a center while a size ratio of a length from the reference point to the second horizontal line to a vertical length of the trimming frame is maintained. As a result, the portrait image trimmed away by the trimming frame reaches a condition where the vertex part and chin are arranged at appointed positions in the trimming frame.

However, in the above-mentioned publication, since the first horizontal line, second horizontal line, and vertical line have been fixed within the trimming frame in advance, an operator cannot set horizontal lines and vertical lines agreeable to his/her preference. For example, with regard to a plurality of landscape images, when an operator wishes to compare the respective landscape images with each other after setting horizontal positions of the respective landscape images at positions of his/her choice, he/she has no choice but to perform the operation by trusting his/her intuition. In addition, with regard to an image of a plurality of persons, when an operator wishes to arrange the faces of two persons thereof at a predetermined position in the trimming frame, he/she also has no choice but to perform the operation by trusting his/her intuition.

SUMMARY OF THE INVENTION

The present invention has been made in light of such problems, and it is an object of the invention to provide an image processing method and an image processor capable of, when trimming away a processing object image by a trimming frame, easily positioning a target contained in that processing object image at a desirable position in the trimming frame.

In order to achieve at least one of the above-mentioned objects, the present invention has adopted the following means.

The present invention is directed to an image processing method by computer software, for processing for trimming away a processing object image displayed on display means by use of a trimming frame, comprising the steps of: (a) setting guidelines at predetermined positions of the trimming frame based on an operator's setting operation so as to provide a trimming frame with guidelines; and (b) while displaying the trimming frame with guidelines on the processing object image in an overlapping manner, shifting and displaying the trimming frame with guidelines on the processing object image based on the operator's shifting operation as well as enlarging or contracting and displaying the trimming frame with guidelines so as to become a similar form based on the operator's enlarging or contracting operation.

According to this image processing method, guidelines are set at predetermined positions of a trimming frame based on an operator's setting operation so as to provide a trimming frame with guidelines, and while the trimming frame with guidelines is displayed on a processing object image in an overlapping manner, this trimming frame with guidelines is shifted and displayed on the processing object image based on the operator's shifting operation, and the trimming frame with guidelines is enlarged or contracted and displayed so as to become a similar form based on the operator's enlarging or contracting operation. The operator can thus shift and enlarge or contract the trimming frame with guidelines so that the guidelines set by him/herself and a target contained in the processing object image have a desirable positional relationship. When trimming away a processing object image by the trimming frame, the operator can easily position a target contained in the processing object image at a desirable position within the trimming frame.

Here, the "guidelines" may be straight lines such as horizontal lines and vertical lines, may be curved lines such as wavy lines and free curves, or may be diagrammatic outlines such as circles, ellipses, and polygons.

In the image processing method of the invention, the step (a) may set guidelines at predetermined positions of the trimming frame based on guideline setting positions inputted by the operator. In this case, the guideline setting positions may be set by an operator's inputting, with regard to horizontal lines and vertical lines of guidelines, as to whether or not to pass through a center of the trimming frame, how distant positions from the center to pass through, or how distant positions from sides of the trimming frame to pass through.

In the image processing method of the invention, the step (a) may set guidelines at predetermined positions of the trimming frame based on a guideline dragging operation by the operator so as to provide a trimming frame with guidelines. In this case, when one guideline is dragged by the operator, another guideline may be shifted in an interlocking manner with the dragged guideline, be shifted by a distance the same as a shifting distance of the dragged guideline, or be shifted in a direction the same as or opposite to a shifting direction of the dragged guideline.

In the image processing method of the invention, the step (a) may set guidelines within a preset range of the maximum number.

In the image processing method of the invention, the step (a) may set guidelines at predetermined positions of the trimming frame based on the operator's setting operation, while the trimming frame is displayed on the display means, so as to display the trimming frame as the trimming frame with guidelines.

In the image processing method of the invention, the step (a) may display the trimming frame with guidelines on the display means so that a correspondence between guideline setting position inputting section to be filled in by the operator and guidelines within the trimming frame with guidelines can be visually recognized.

In the image processing method of the invention, the step (b) may display a first display portion for displaying the trimming frame with guidelines on the processing object image in an overlapping manner along with a second display portion for displaying a region, of the processing object image, enclosed by the trimming frame with guidelines in a manner fitted in a photo frame as a print preview.

In the image processing method of the invention, the step (a) may prepare a new photo frame which serves also as a trimming frame based on setting operation of the operator, and set a trimming frame with guidelines based on the prepared photo frame.

The image processing method of the invention may be actualized as a program that causes one or multiple computers to execute respective steps of the image processing method described above. The program may be recorded in a computer readable recording medium (for example, a hard disk, a ROM, an FD, a CD, or a DVD), may be transferred from one computer to another computer via a transfer medium (a communication network like the Internet or a LAN), or may be transmitted in any other suitable form. Causing one computer execute all of the procedures or multiple computers share execution of the procedures allows an operator to, when trimming away a processing object image by the trimming frame, easily position a target contained in the processing object image at a desirable position within the trimming frame.

The present invention is also directed to an image processor capable of processing for trimming away a processing object image displayed on display means by use of a trimming frame. The image processor includes: guideline setting means for setting guidelines at predetermined positions of the trimming frame based on an operator's setting operation so as to provide a trimming frame with guidelines; and display control means for, while displaying the trimming frame with guidelines on the processing object image in an overlapping manner, shifting and displaying the trimming frame with guidelines on the processing object image based on the operator's shifting operation as well as enlarging or contracting and displaying the trimming frame with guidelines so as to become a similar form based on the operator's enlarging or contracting operation.

With this image processor, the operator can shift and enlarge or contract the trimming frame with guidelines so that the guidelines set by him/herself and a target contained in the processing object image have a desirable positional relationship. When trimming away a processing object image by the trimming frame, the operator can easily position a target contained in the processing object image at a desirable position within the trimming frame. The image processor of the invention may additionally have any of the arrangements described above in connection with the image processing method.

DESCRIPTION OF THE PREFERRED EMBODIMENTS

Figure 1:
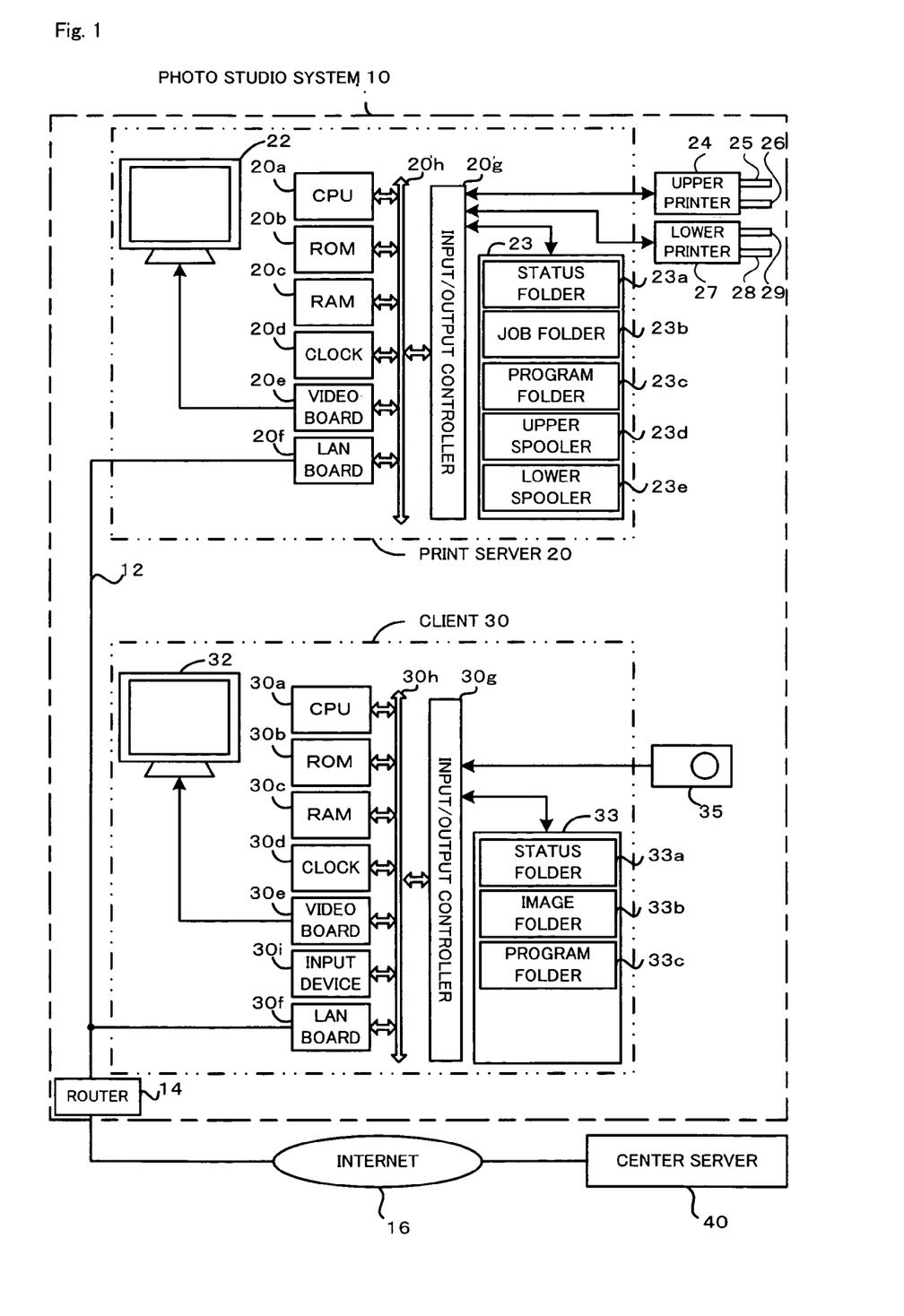
FIG. 1 schematically illustrates a configuration of a photo studio system 10 in one embodiment of the invention.

Next, an embodiment of the present invention will be described based on the drawings. FIG. 1 is a block diagram showing a schematic configuration of a photo studio system 10 of an embodiment of the present invention.

The photo studio system 10 is composed of a print server 20, two printers 24 and 27, and a client 30, and the print server 20 and client 30 are connected so as to be communicable by a LAN cable 12. Also, the print server 20 and client 30 are connected so as to be communicable via a center server 40 and Internet 16.

In the print server 20, a CPU 20a for executing various types of arithmetic processing, a ROM 20b on which programs for a hardware setting have been recorded, a RAM 20c for temporarily recording data when the CPU 20a executes various types of arithmetic processing, a clock generator 20d for generating a motion clock, a video board 20e provided with a display connector to which a display 22 is connected, a LAN board 20f to which a LAN cable 12 to construct a LAN are connected, and an input/output controller 20g for a connection with various types of equipment and control are connected via a bus 20h. To the input/output controller 20g, a hard disk 23 is connected and the two printers 24 and 27 are connected via USB terminals, respectively. The LAN cable 12 connected to the LAN board 20f connected to the client 30 and a router 14. This print server 20 is connected to the Internet 16 via the router 14.

The hard disk 23 includes a status folder 23a for storing status data of the printers 24 and 27, a job folder 23b for storing various types of data contained in a print command from the client 30 as a print job, a program folder 23c for storing various types of programs, an upper spooler 23d for retaining, as a spool, two jobs of a print job for which printing is in execution and a print job scheduled to be printed next time with regard to the upper printer 24, and a lower spooler 23e for retaining, as a spool, two jobs of a print job for which printing is in execution and a print job scheduled to be printed next time with regard to the lower printer 27.

The status folder 23a stores sizes and types of paper mountable on the printers 24 and 27, sizes and types of paper currently mounted on the printers 24 and 27, statuses of execution by the printers 24 and 27 such as executing print jobs, waiting for print jobs, and a paper jam, and an ICC profile as color reproducibility data of the printers 24 and 27. The job folder 23b stores various types of data contained in a print command, namely, a job script including a printer designation, a paper size and a paper type, a layout script including matters necessary for determining a printing layout, image data fitted in a photo frame of a layout, and an ICC profile attached to image data. The program folder 23c includes a printer driver for controlling the upper printer 24, a printer drive for controlling the lower printer 27, a color converter for carrying out a color correction of image data by generating a color correction table based on an ICC profile of a printer to be used and an ICC profile attached to image data, a print command receiving program for receiving a print command, a print execution control program for controlling a print command execution, and a web browser for browsing various types of information.

The printers 24 and 27 are both inkjet printers using pigment inks, having performance capable of outputting highquality printings with a very high light fastness. These printers 24 and 27 are housed in a chassis common to the print server 20, the printer 24 is installed at an upper side, and the printer 27 is installed at a lower side. Therefore, in the following, the printer 24 is sometimes referred to as an upper printer, and the printer 27, as a lower printer. In addition, the printer 24 is supplied with paper by two cassettes 25 and 26, while the printer 27 is supplied with paper by two cassettes 28 and 29.

The client 30 corresponds to an image processor of the present invention, in which a CPU 30a for executing various types of arithmetic processing, a ROM 30b on which programs for a hardware setting have been recorded, a RAM 30c for temporarily recording data when the CPU 30a executes various types of arithmetic processing, a clock generator 30d for generating a motion clock, a video board 30e provided with a display connector to which a display 32 is connected, a LAN board 30f to which a LAN cable 12 to construct a LAN are connected, an input device 30i such as a keyboard and a mouse to be operated by an operator, and an input/output controller 30g for a connection with various types of equipment and control are connected via a bus 30h. To the input/output controller 30g, a hard disk 33 is connected and a digital still camera 35 is connected via a USB terminal if necessary. The LAN cable 12 connected to the LAN board 30f is connected to the print server 20 and router 14. This client 30 is connected to the Internet 16 via the router 14.

The hard disk 33 includes a status folder 33a for storing status data obtained from the print server 20, an image folder 33b for storing image data photographed by the digital still camera 35 and image data after retouching, and a program folder 33c for storing various types of programs.

The status folder 33a stores sizes and types of paper mountable on the printers 24 and 27, sizes and types of paper currently mounted on the printers 24 and 27, statuses of execution by the printers 24 and 27 such as executing print jobs, waiting for print jobs, and a paper jam. These pieces of data are updated at each time as data stored in the status folder 23a of the print server 20 is transmitted from the print server 20 periodically or at an operator's request. The program folder 33c stores a photo retouching software for applying, to a photo image of a digital image, a desirable enhancement such as trimming, a partial modification, and an overall color adjustment, a layout editing software for laying out photo images of digital images on a printing paper as well as outputting a print command to the print server 20, and a web browser capable of browsing various types of information provided from the print server 20 or center server 40.

The center server 40 plays a role to administrate operating conditions of the photo studio systems 10 of a large number of photo studios in a concentrated manner, and is installed at a place different from that of photo studios. This center server 40 is connected to the print servers 20 and clients 30 of the respective photo studio systems 10 so as to be communicable via the Internet 16. The center server 40 has a function to collect various types of information from the print servers 20 of the respective photo studio systems 10 and save and administrate the same in a database of the center server 40. In addition, the center server 40 also has a function to calculate, based on various types of information of each photo studio, the amount of consumption of consumables such as paper and inks in that photo studio, and to arrange a distribution of consumables and charge each photo studio for the same. Furthermore, the center server 40 has a function to provide, when accepting a login from the client 30 of each photo studio through the web browser, various types of information concerning that photo studio in the custody of the database of the center server 40 for that web browser.

Description now regards a usage example of the photo studio system 10. A cameraman photographs an object by use of the digital still camera 35, then connects the digital still camera 35 to the client 30, and shifts or copies desirable images from a built-in image recording medium of the digital still camera 35 into the image folder 33b of the hard disk 33 of the client 30. As a result, various types of images are stored in the image folder 33b of the client 30. In addition, the cameraman starts up the photo retouching software in the client 30, and retouches images by making use of functions of the started photo retouching software. Concretely, the various types of images stored in the image folder 33b are displayed as thumbnails on a display 32, and a desirable image is read in out of the stored images. Then a photo image of the read image is displayed in a large size at the center of the display 32, the cameraman applies a desirable enhancement such as trimming, a partial modification, and an overall color adjustment while observing that display, and saves the image in the image folder 33b again. Here, trimming will be prescribed later in detail.

Next, brief description will be given of an operation of an operator (such as a cameraman or studio staff) from pasting a desirable image out of images saved in the image folder 33b onto a photo frame to making the printers 24 and 27 print the same by use of the client 30.

Figure 2:
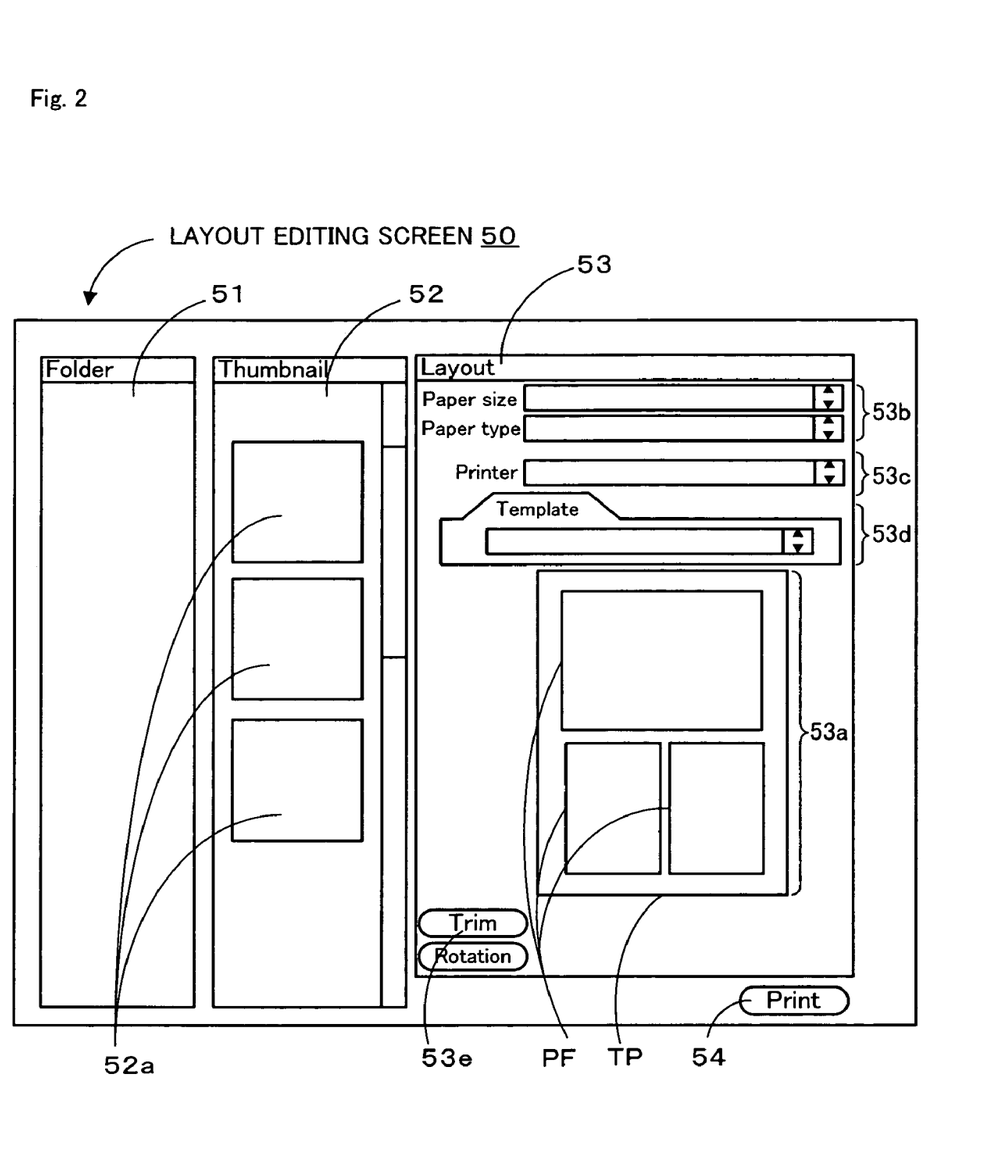
FIG. 2 shows an example of a layout editing screen 50.

First, the operator operates the input device 30i of the client 30 to start up the layout editing software. When the layout editing software has been started, the client 30 displays a layout editing screen 50 on the display 32. The layout editing screen 50 includes, as shown in FIG. 2, a folder section 51 for displaying folders contained in the image folder 33b, a thumbnail section 52 for displaying thumbnails 52a of photo images stored in a folder selected in the folder section 51, a layout section 53 containing a layout image 53a which shows a conditioned images after thumbnails 52a selected in the thumbnail section 52 have been dragged and pasted onto respective photo frames PF of a predetermined template TP, and a print button 54 to be selected to carry out a print output. The layout section 53 is further provided with a paper selecting section 53b for selecting a paper size such as A4 or A3-extension and a paper type such as a luster paper or a matte paper, a printer selecting section 53c for selecting a printer, a template selecting section 53d for selecting a desirable template out of templates, and a trim button 53e to be selected to process an image by trimming in the photo frame PF. In the printer selecting section 53c, the upper printer 24, lower printer 27, and "Auto" are displayed as menus, and when the "Auto" is selected, a printer is automatically selected according to availability of the printers 24 and 27 in the print server 20. In the template selecting section 53d templates downloaded from the print server 20 and templates saved in the hard disk 33 are displayed. In the present embodiment, selection of a folder in the folder section 51, selection of paper size and paper type in the paper selecting section 53b, selection of a printer to be used in the printer selecting section 53c, selection of a template in the template selecting section 53d have been inputted by the operator in advance. The client 30 displays a layout editing screen 50 on the display 32, based on contents of the input from the operator.

When the operator has carried out some operation on the layout editing screen 50 via the input device 30i, the client 30 executes various types of processing based on this operation. For example, when the operator has selected dragged a desirable photo image from the thumbnail section 52 onto a desirable photo frame PF in the template TP of the layout image 53a, the client 30 displays the selected photo image in a condition fitted in the photo frame PF. Also, when the operator has changed the folder selected in the folder section 51, has operated the thumbnail section 52 by scrolling, or has changed the contents selected in the paper selecting section 53b, printer selecting section 53c, or template selecting section 53d of the layout section 53, the client 30 changes the display on the layout editing screen 50 of the display 32 based on these operations. Also, when an on-operation of the print button 54 has been carried out, the client 30 prepares a print command for instructing printing on the conditions when the layout image 53a was prepared and outputs the same to the print server 20. The editing operation by client 30 when the operator has selected the trim button 53e will be described later in detail.

Meanwhile, it is also possible to set guidelines at a desirable photo frame PF in the template TP to provide a photo frame with guidelines, if necessary, prior to an editing operation by the layout editing screen 50. Hereinafter, description will be given of this point. Here, a trimming frame TF is prepared to have a similar form to that of a photo frame PF, setting a photo frame with guidelines results in providing corresponding trimming frame with guidelines.

Figure 3:
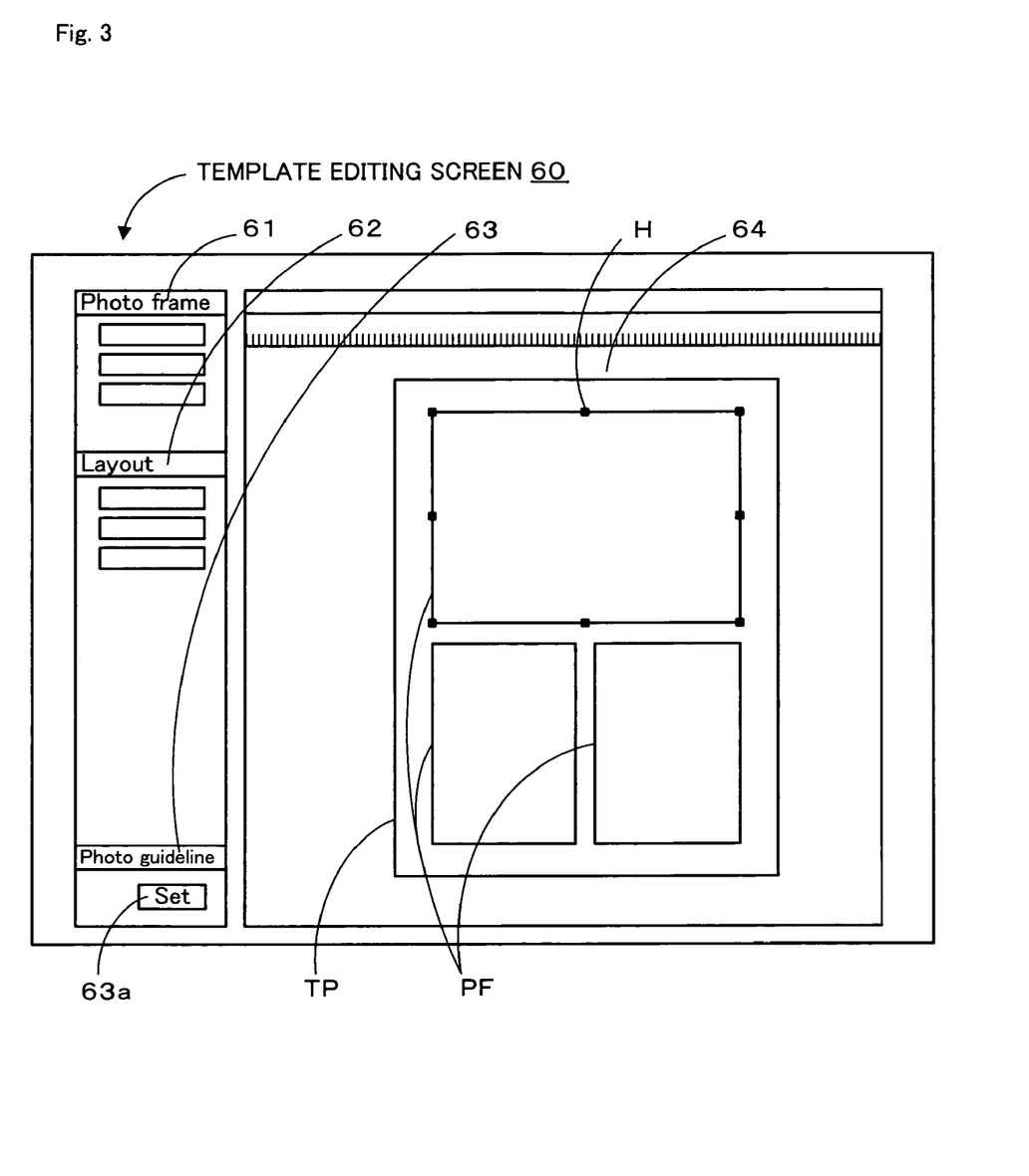
FIG. 3 shows an example of a template editing screen 60.

First, in response to an operator's operation of the input device 30i to call up a template editing screen, the client 30 displays a template editing screen 60 on the display 32. The template editing screen 60 includes, as shown in FIG. 3, a photo frame editing section 61 arranged with various types of photo frame editing tool buttons for photo frame PF editing operations, a layout editing section 62 arranged with various types of layout editing tool buttons for layout editing operations such as centering, flush left, and flush right, a guideline setting section 63 provided with a set button 63a for setting guidelines at photo frames PF laid out on a template TP, and a template display section 64 for displaying a template TP on which photo frames PF have been laid out in a predetermined paper size.

Figure 4:
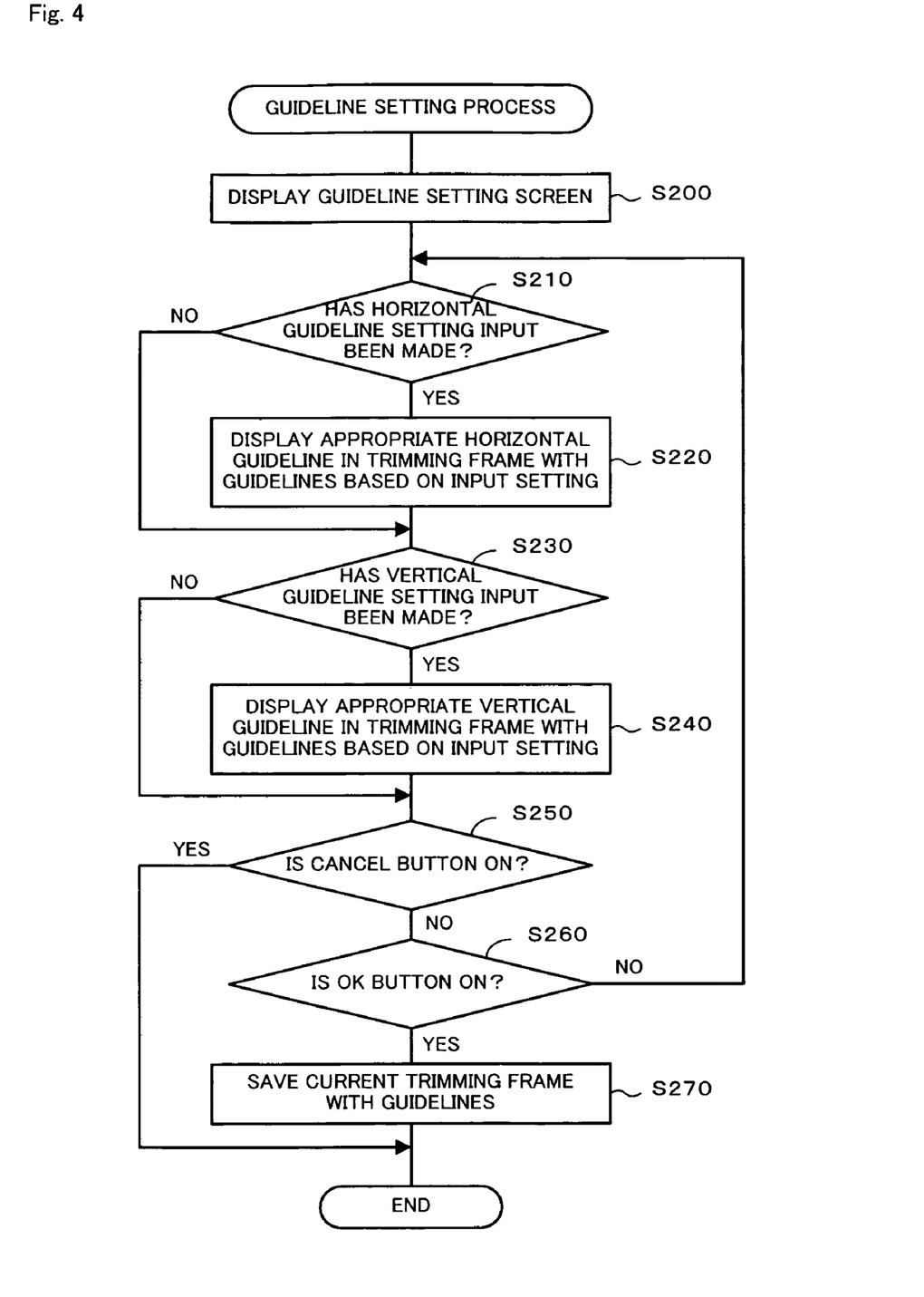
FIG. 4 is a flowchart showing a guideline setting process.

After the template editing screen 60 has been displayed on the display 32, in response to on-operation of the set button 63a of the guideline setting section 63 with any one of the photo frames PF in the template TP displayed on the template display section 64 being selected, the client 30 reads out a guideline setting process routine shown in a flowchart of FIG. 4 from the program folder 33c and executes the same. In the selected photo frame PF, black quadrangular handles H have been displayed at four corners and the middles of the respective sides thereof (see the photo frame PF arranged at the upper middle in the template TP of FIG. 3). When the guideline setting process routine is started, the client 30 displays a guideline setting screen 70 shown in FIG. 5 on the display 32 (step S200).

Figure 5:
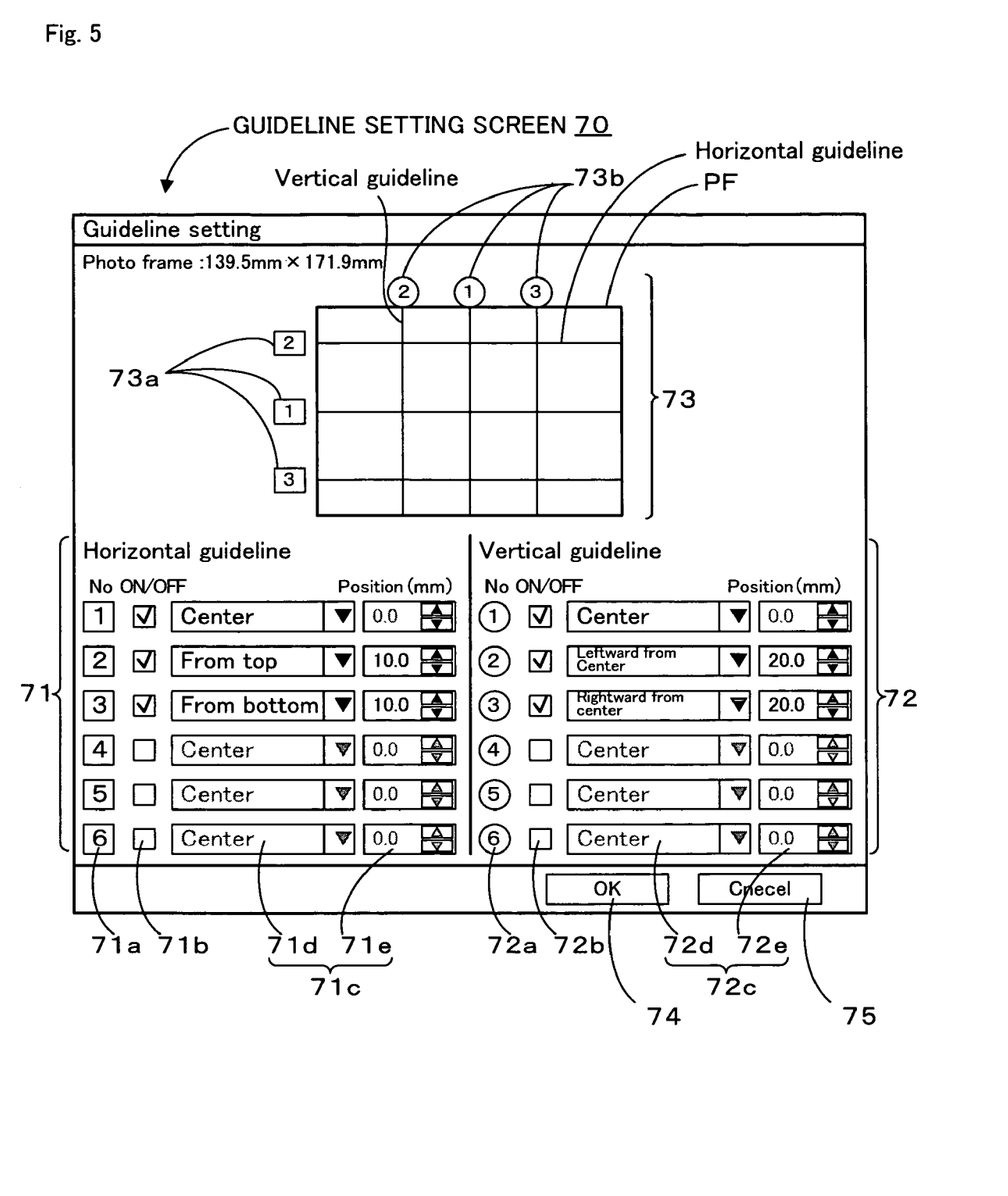
FIG. 5 shows an example of a guideline setting screen 70.

This guideline setting screen 70 includes a horizontal guideline setting inputting section 71 for setting six horizontal guidelines, a vertical guideline setting inputting section 72 for setting six vertical guidelines, a photo frame with guidelines display section 73 where guidelines have been displayed on a selected photo frame PF in an overlapping manner, an OK button 74 to be selected when saving the contents of a guideline setting, and a cancel button 75 to be selected when not saving the contents of a guideline setting.

The horizontal guideline setting inputting section 71 has FIG. 71a within squares for specifying horizontal guidelines, check boxes 71b for selecting whether or not to use the horizontal guidelines, and pas sing point inputting sections 71c for inputting positions through which the horizontal guidelines pass. The FIG. 71a within squares correspond to FIG. 73a within squares used for horizontal guidelines which are displayed in the photo frame with guidelines display section 73. The check boxes 71b are checked when the operator uses horizontal guidelines with the FIG. 71a within squares shown on the left side, and are unchecked when not using the same. The passing point inputting sections 71c are provided with reference selecting sections 71d for selecting references and distance inputting sections 71e for inputting distances from the references. In the reference selecting sections 71d, "center," "from the top," "from the bottom," "upward from the center," or "downward from the center" of the photo frame can be selected by a pull-down menu, and in the distance inputting sections 71e, an arbitrary numerical value can be inputted within a range not deviating from the photo frame PF. In the horizontal guideline setting inputting section 71, the passing position inputting sections 71c are displayed in gray so as to prohibit input with regard to items whose check boxes 71b are unchecked. Also, in the passing position inputting sections 71c, with regard to items for which "center" has been selected in the reference selecting sections 71d, since it is obvious that horizontal guidelines thereof pass through the center of the photo frame PF, the distance inputting sections 71e are displayed in gray so as to prohibit input.

The vertical guideline setting inputting section 72 has circled FIG. 72a for specifying vertical guidelines, check boxes 72b for selecting whether or not to use the vertical guidelines, and passing point inputting sections 72c for inputting positions through which the vertical guidelines pass. Of these, the circled FIG. 72a correspond to circled FIG. 73b used for respective vertical guidelines which are displayed in the photo frame with guidelines display section 73. The check boxes 72b are checked when the operator uses vertical guidelines with the circled FIG. 71b shown on the left side, and are unchecked when not using the same. The passing point inputting sections 72c are provided with reference selecting sections 72d for selecting references and distance inputting sections 72e for inputting distances from the references. In the reference selecting sections 72d, "center," "from the top," "from the bottom," "leftward from the center," or "rightward from the center" of the photo frame can be selected by a pull-down menu, and in the distance inputting sections 72e, an arbitrary numerical value can be inputted within a range not running out of the photo frame PF. In the vertical guideline setting inputting section 72, the passing position inputting sections 72c are displayed in gray so as to prohibit input with regard to items whose check boxes 72b are unchecked. Also, in the passing position inputting sections 72c, with regard to items for which "center" has been selected in the reference selecting sections 72d, since it is obvious that vertical guidelines thereof pass through the center of the photo frame PF, the distance inputting sections 72e are displayed in gray so as to prohibit input.

The photo frame with guidelines display section 73 displays, based on data inputted in the horizontal guideline setting inputting section 71 and vertical guideline setting inputting section 72, a photo frame PF in which horizontal guidelines and vertical guidelines have been arranged at predetermined positions. Here, the FIG. 73a within squares used for the horizontal guidelines correspond to the FIG. 71a within squares of the horizontal guideline setting inputting section 71, and the circled FIG. 73b used for the vertical guidelines correspond to the circled FIG. 72a of the vertical guideline setting inputting section 72.

Now, the client 30 judges whether or not an input operation into the horizontal guideline setting inputting section 71 of the guideline setting screen 70 has been made (step S210). In response to an input operation into the horizontal guideline setting inputting section 71, the client 30 displays an appropriate horizontal guideline(s) at a predetermined position(s) in the photo frame PF based on a setting input value(s) (step S220). Then, after carrying out this display or if no input operation into the horizontal guidelines has been made in step S210, the client 30 judges whether or not an input operation into the vertical guideline setting inputting section 72 of the guideline setting screen 70 has been made (step S230). In response to an input operation into the vertical guideline setting inputting section 72, the client 30 displays an appropriate vertical guideline(s) at a predetermined position(s) in the photo frame PF based on a setting input value(s). Then, after carrying out this display or if no input operation into the vertical guidelines has been made in step S230, the client 30 judges whether or not the cancel button 75 has been selected (step S250). When the cancel button 75 has not been selected, the client 30 subsequently judges whether or not the OK button 74 has been selected (step S260). When the OK button has not been selected either, the procedure returns to step S210. In response to selection of the OK button 74 in step S260, on the other hand, the client 30 applies respective guidelines which have been set at those points in the photo frame PF to prepare a photo frame with guidelines, saves the prepared photo frame with guidelines in a predetermined region of the hard disk 33 (step S270), and ends the present routine. When the cancel button 75 has been selected in step S250, the client 30 ends the present routine without setting guidelines.

Figure 6:
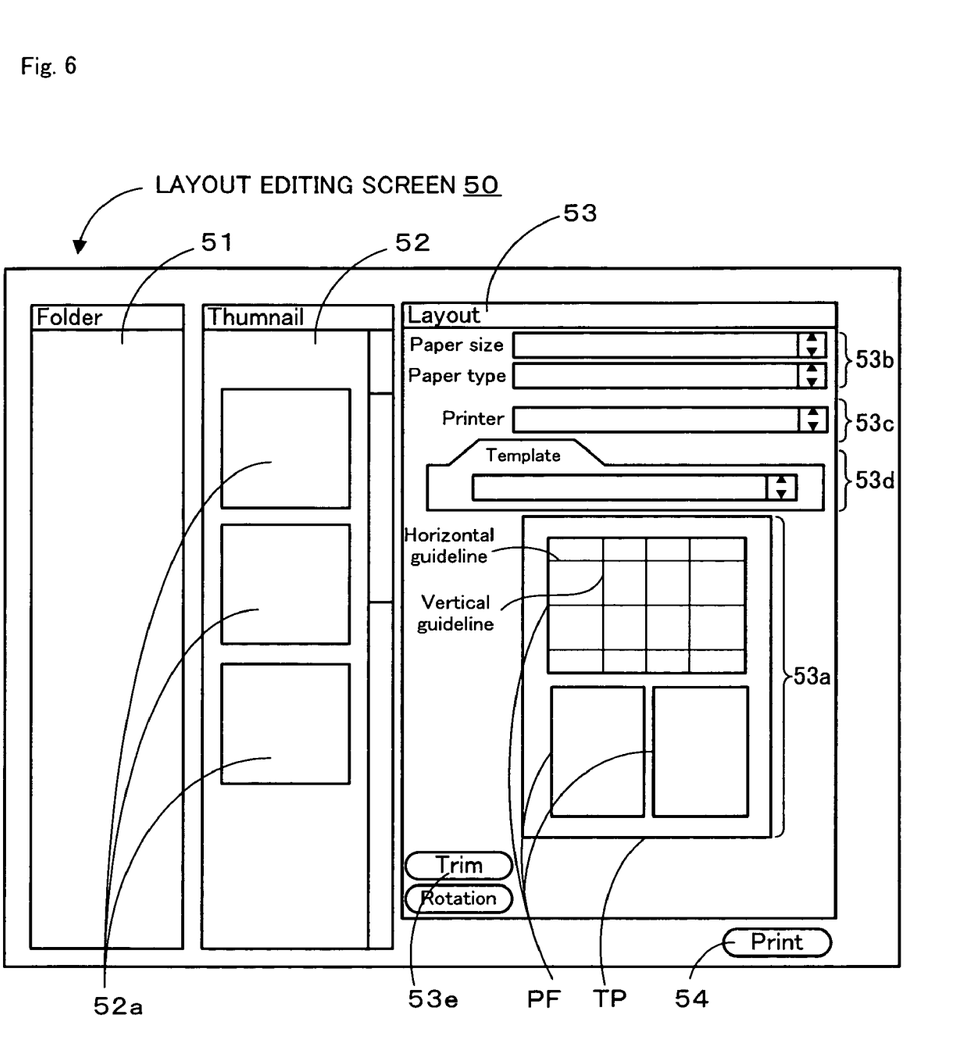
FIG. 6 shows an example of a layout editing screen 50 after guidelines are set.

After executing the above guideline setting process, in response to the operator's operation of the input device 30i in the client 30 to open the layout editing screen 50 and the operator's selection of a template TP having photo frames PF in which guidelines have been set as mentioned above by the template selecting section 53d, the client 30 displays, of a template TP displayed in the layout image 53a of the layout editing screen 50 as in FIG. 6, an upper middle photo frame PF as a photo frame with guidelines.

Next, a process when the operator drags and pastes an image onto the photo frame PF with guidelines of the template TP by operating the input device 30i on the layout editing screen 50 of FIG. 6 and then trims the image will be described in the following.

Figure 7:
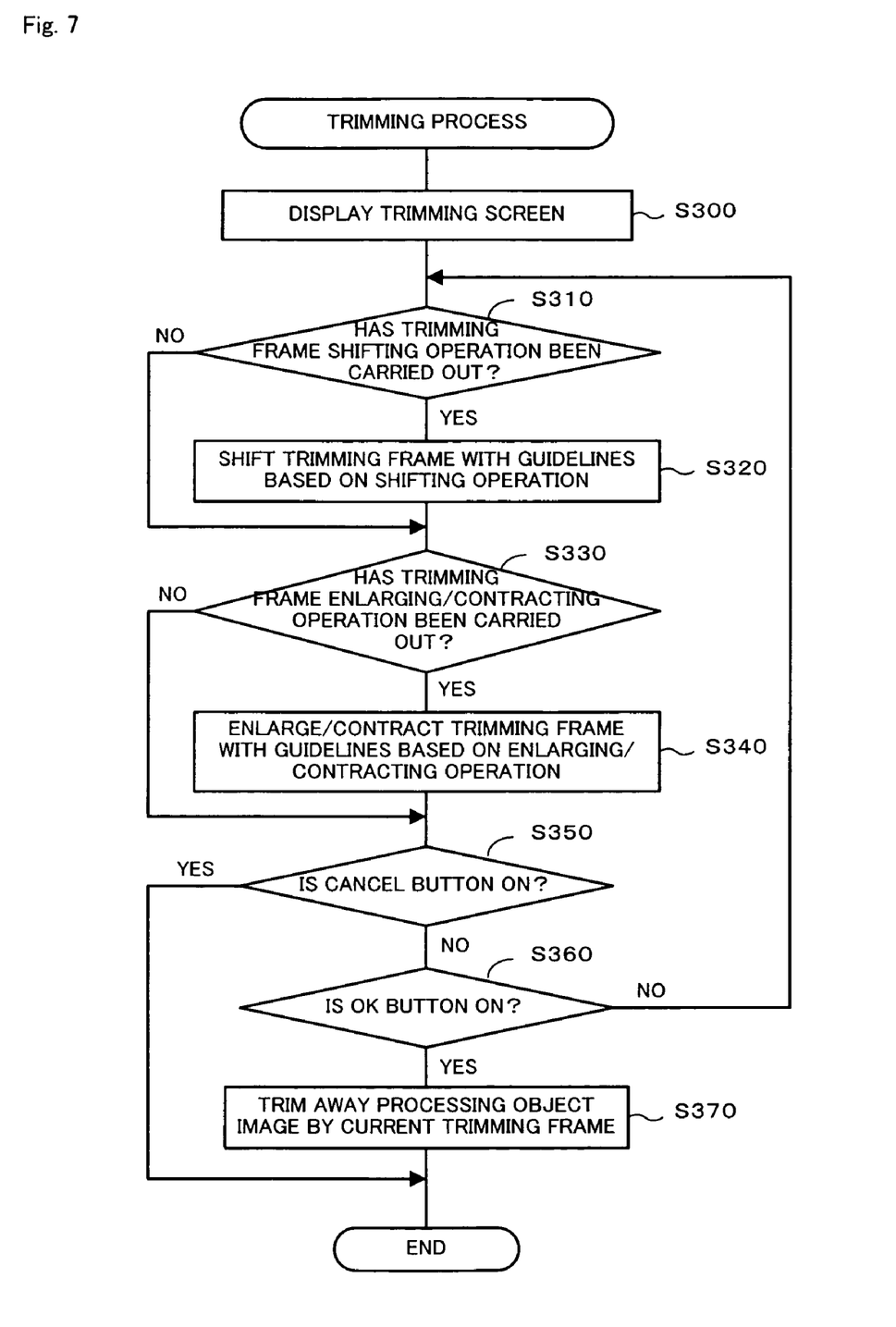
FIG. 7 is a flowchart showing a trimming process.

When the trim button 53e is selected in a condition where a photo frame PF with guidelines displayed in the layout image 53a of the layout editing screen 50 has been selected, the client 30 reads out a trimming process routine shown in a flowchart of FIG. 7 from the program folder 33c and executes the same. When the trimming process routine is started, the client 30 displays a trimming screen 80 shown in FIG. 8 on the display 32 (step S300).

Figure 8:
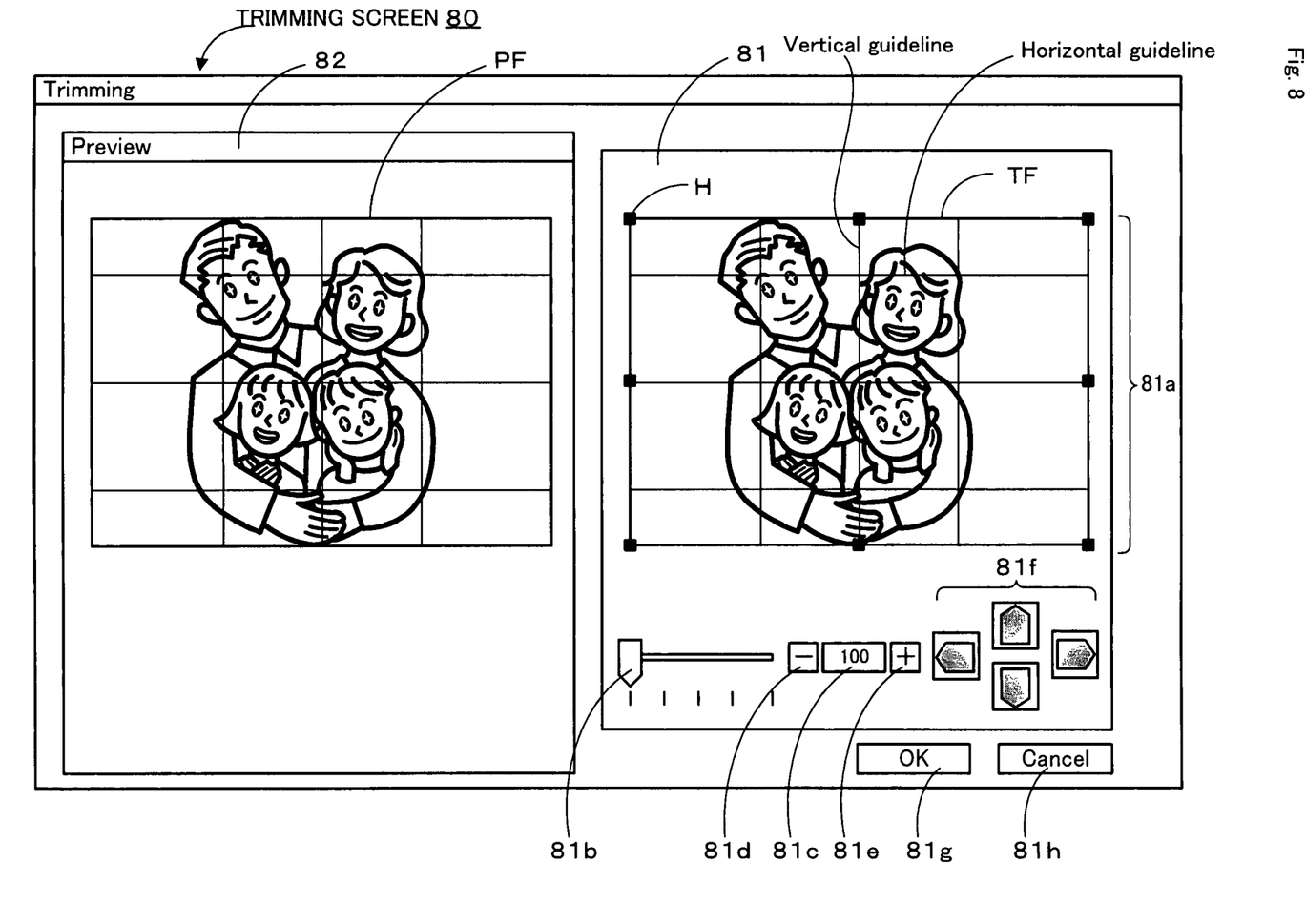
FIG. 8 shows an example of trimming screen 80.

The trimming screen 80 includes a trimming display portion 81 for carrying out a trimming operation on the right side of the screen and a preview display portion 82 for displaying a print preview on the left side of the screen. The trimming display portion 81 includes a processing object image display portion 81a for displaying an image pasted onto a photo frame PF with guidelines, namely, a processing object image, at a predetermined size according to a size of the photo frame PF as well as for displaying, on this processing object image, a trimming frame TF with guidelines in an overlapping manner, a slider 81b for enlarging or contracting the trimming frame TF with guidelines, a magnification display portion 81c for displaying a magnification when, of the processing object image, a part surrounded by the trimming frame TF with guidelines is fitted in the photo frame PF, a minus button 81d for reducing magnification displayed in the magnification display portion 81c at the left side of the magnification display portion 81c, a plus button 81e for increasing magnification displayed in the magnification display portion 81c at the right side of the magnification display portion 81c, cursor keys 81f for minutely shifting the photo frame PF with guidelines upward, downward, leftward, and rightward on the processing object image, an OK button 81g for saving an image after trimming the processing object image by the trimming frame TF with guidelines in a predetermined region of the hard disk 33, and a cancel button 81h for canceling a trimming process. In addition, on the preview display portion 82, an image when a region, of the processing object image, enclosed by the trimming frame TF with guidelines is fitted in the photo frame PF in the trimming display portion 81 is displayed as a print preview.

While displaying the trimming screen 80 on the display 32, the client 30 judges whether or not a shifting operation of the trimming frame TF with guidelines has been carried out by the operator (step S310). In response to a shifting operation by the operator, the client 30 shifts the trimming frame TF with guidelines on the processing object image of the trimming display portion 81, based on the shifting operation (step s320). Here, the shifting operation means an operation for dragging while grasping a part other than black quadrangular handles H at four corners of the trimming frame TF with guidelines or at the middles of respective sides thereof or an operation by the cursor keys 81f.

After step S320 or if no shifting operation has been carried out in step S310, the client 30 judges whether or not an enlarging/contracting operation of the trimming frame TF with guidelines has been carried out by the operator (step S330). In response to an enlarging/contracting operation by the operator in step S330, the client 30 displays the trimming frame TF with guidelines on the processing object image of the trimming display portion 81 in an enlarged or contracted manner, based on-the enlarging/contracting operation (step S340). Here, the enlarging/contracting operation means an operation for dragging while grasping a part other than black quadrangular handles H at four corners of the trimming frame TF with guidelines or at the middles of respective sides thereof, an operation for sliding the slider 81b, or an operation for clicking the minus button 81d or plus button 81e.

When carrying out a shifting operation and an enlarging/contracting operation, the operator carries out the operation so that a positional relationship between horizontal guidelines and vertical guidelines of the trimming frame TF with guidelines and a target of the processing object image reaches a desirable positional relationship. For example, in FIG. 9, for trimming two persons of a girl and a boy from a processing object image of four family members, a shifting operation and an enlarging/contracting operation are carried out so that a vertical guideline which passes through the center of a photo frame PF is positioned between the girl and boy, a left-hand vertical guideline is positioned almost in the middle of the girl's face, aright-hand vertical guideline is positioned almost in the middle of the boy's face, an upper horizontal guideline is positioned at vertex parts of the two, and a lower horizontal guideline is positioned at chin parts of the two.

After step S340 or if no enlarging/contracting operation has been carried out in step S330, the client 30 judges whether or not the cancel button 81h has been selected (step S350). If the cancel button 81h has not been selected, the client 30 subsequently judges whether or not the OK button 81g has been selected (step S360). When the OK button 81g has not been selected either, the procedure returns to step S310. In response to selection of the OK button in step S360, on the other hand, the client 30 saves an image after trimming the processing object image by the trimming frame TF with guidelines in a predetermined region of the hard disk 33 (step S370), and ends the present routine. In response to selection of the cancel button 81h in step S350, the client 30 ends the present routine without carrying out trimming.

Herein, a correspondence between components of the present embodiment and components of the present invention will be defined. The CPU 30a of the client 30 of the present embodiment corresponds to a guideline setting means, a display control means, and a new photo frame setting means of the present invention. The display 32 corresponds to a display means. Moreover, in the present embodiment, an example of an image processing method of the present invention is also defined by describing operations of the client 30.

In the client 30 of the present embodiment described above a photo frame PF in which guidelines have been set at predetermined positions based on an operator's setting operation is provided as a trimming frame TF with guidelines, and in a condition where the trimming frame TF with guidelines is displayed on a processing object image in an overlapping manner, this trimming frame TF with guidelines is shifted and displayed on the processing object image based on an operator's shifting operation, and is enlarged or contracted and displayed so as to become a similar form based on an operator's enlarging or contracting operation. The operator can shift and enlarge or contract the trimming frame TF with guidelines so that the guidelines set by him/herself and the target contained in the processing object image have a desirable positional relationship. Therefore, when trimming away a processing object image by the trimming frame TF, the operator can easily position a target contained in the processing object image at a desirable position within the trimming frame TF.

Moreover, setting the center and upper, lower, left, and right sides of a photo frame PF and inputting numerical distances from the reference points is sufficient to set guidelines. The operator can thus set guidelines easily and sensuously grasp setting positions of the guidelines.

In the client 30 of the embodiment, the maximum numbers of horizontal guidelines and vertical guidelines are respectively set to six. With too many guidelines, the operator cannot recognize easily with what guideline a target contained in the processing object image is to be aligned, when trimming away a processing object image by a trimming frame TF. Here, the maximum numbers of guidelines may be appropriately determined according to a frame size and the like.

In the client 30 of the embodiment, on the guideline setting screen 70, while displaying a photo frame PF to be a trimming frame, horizontal or vertical guidelines are set at predetermined positions of the photo frame PF based on an operator's setting operation so as to provide a photo frame PF with guidelines. The operator can visually, promptly recognize the photo frame PF having guidelines set by him/herself.

In the client 30 of the embodiment, on the guideline setting screen 70, the FIGS. 71a and 73a within squares allow to visually check what item of the horizontal guideline setting inputting section 71 corresponds to what horizontal guideline of the photo frame with guidelines display section 73, while the circled FIGS. 72a and 73b allow to visually check what item of the vertical guideline setting inputting section 72 corresponds to what vertical guideline of the photo frame with guidelines display section 73. With this arrangement, the operator is never confused when setting a plurality of guidelines.

In the client 30 of the embodiment, the trimming screen 80 contains the trimming display portion 81 for displaying a trimming frame TF with guidelines on a processing object image in an overlapping manner and the preview display portion 82 for displaying a region of a processing object image, which is enclosed by a trimming frame TF with guidelines in a manner fitted in a photo frame PF as a print preview. The operator can carry out a shifting operation and an enlarging/contracting operation of the trimming frame with guidelines in the trimming region while observing the print preview in the preview region.

In the client 30 of the embodiment, a new photo frame PF which serves also as a trimming frame TF can be prepared based on an operator's setting operation. The operator can set guidelines prepared according to his/her preference in a photo frame PF prepared according to his/her preference so as to provide a trimming frame TF.

Here, needless to say, the present invention is by no means limited to the above-mentioned embodiment, and can be carried out in various modes within the technical scope of the present invention.

The embodiment described-above employs horizontal guidelines as being horizontal lines and vertical guidelines as being vertical lines, for the guidelines. The guidelines may be curved lines such as wavy lines and free curves or may be diagrammatic outlines (for example, outlines indicating persons in silhouette) such as circles, ellipses, and polygons.

In the embodiment described above, the guidelines have been set by inputting distances from reference points. The respective guidelines may otherwise be set so as to shift leftward or rightward and upward or downward according to the operator's drag operation of dragging the horizontal guidelines and vertical guidelines displayed in the photo frame with guidelines display section 73 of FIG. 5. With this arrangement, guidelines can be set without inputting numerical values every time.

Figure 9:
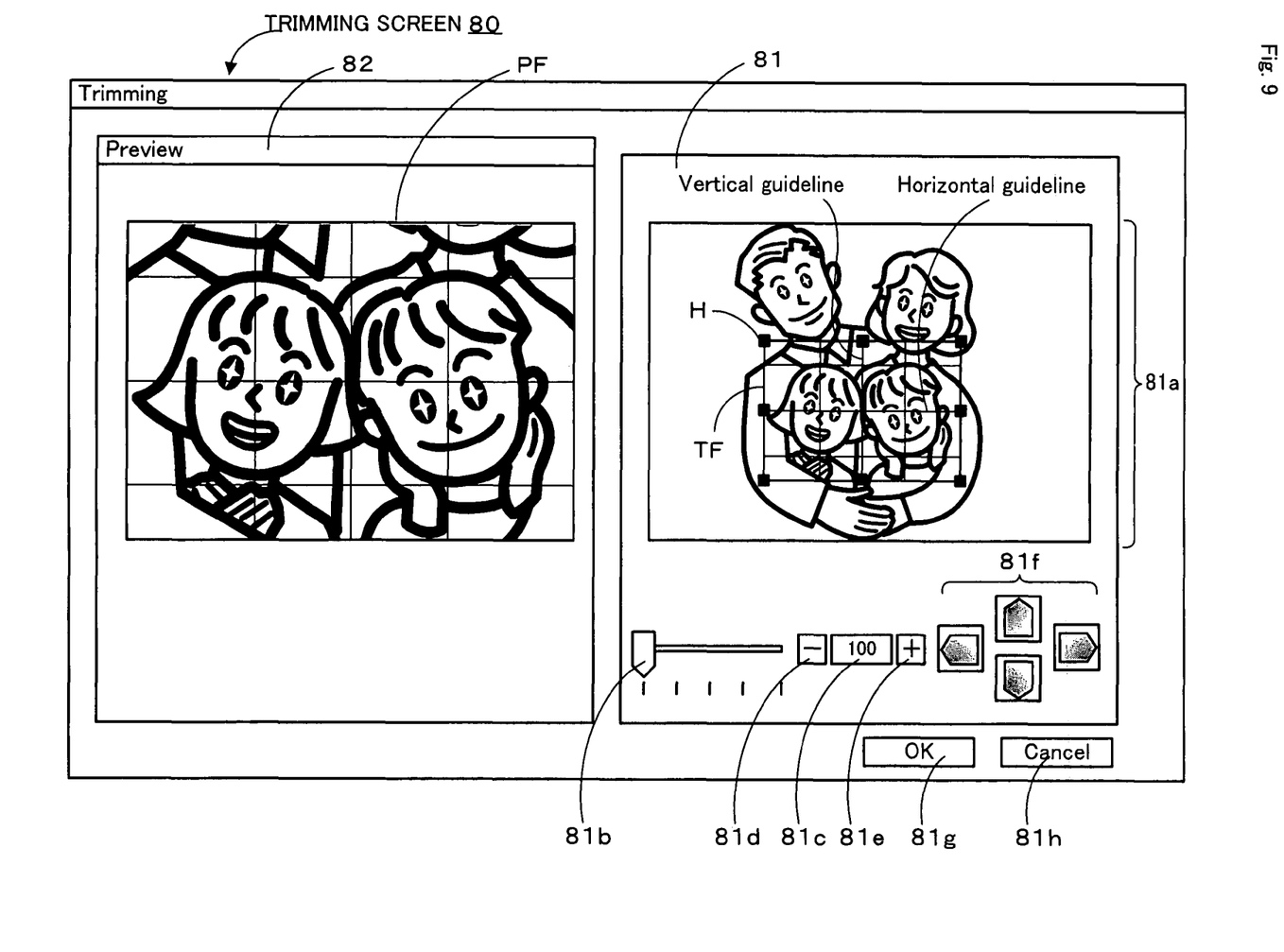
FIG. 9 shows an example of a trimming screen 80 after a trimming frame TF is contracted.

The horizontal guidelines and vertical guidelines maybe provided so as to shift left ward or rightward and upward or downward according to the operator's drag operation, while trimming on the trimming screen shown in FIG. 9. In this case, the guidelines may be provided so that when one guideline is shifted, another guideline is also shifted in an interlocking manner. The other guideline may be a guideline designated by a user or a guideline present at a position line-symmetric with respect to a line passing through the middle of each side of a trimming frame TF as an axis of symmetry. The direction in which another guideline is shifted may be a direction the same as that of a guideline dragged by a user or may be an opposite direction. The distance by which another guideline is shifted may be the same as a shifting distance of a dragged guideline. In FIG. 9, two vertical guidelines which are present at line-symmetric positions with respect to a line passing through the middle of the upper side of the trimming frame TF as an axis of symmetry pass through the centers of the children's faces (herein, the noses), respectively. The arrangement described above makes it easy to shift these two vertical guidelines so as to pass through not the children's noses but eyes, face outlines or the like.

Furthermore, although a description has been given of the client 30 network-connected to the print server 20 connected to the printers 24 and 27 in the aforementioned embodiment, the present invention may be applied to a stand-alone computer connected to printers.

The disclosure of Japanese Patent Application No. 2004-267141 filed on Sep. 14, 2004 including specification, drawings, and claims is incorporated herein by reference in its entirety.

What is claimed is:

1. An image processing method for trimming away a processing object image displayed on display means by use of a trimming frame, comprising the steps of:
   (a) setting, by a computer, guidelines at positions of the trimming frame based on an operator's setting operation so as to provide a trimming frame with guidelines; and
   (b) while displaying the trimming frame with guidelines on the processing object image in an overlapping manner, shifting and displaying the trimming frame based on an operator's shifting operation as well as enlarging or contracting and displaying the trimming frame so as to become a similar form based on an operator's enlarging or contracting operation, wherein, in step (a), an arbitrary number of horizontal and vertical guidelines are set within predetermined maximum values for horizontal and vertical guidelines;

wherein, in said step (a), setting said guidelines at positions of the trimming frame based on the operator's setting operation, while the trimming frame is displayed on the display means, so as to display the trimming frame as the trimming frame with guidelines;

wherein, in said step (a), displaying the trimming frame with guidelines on the display means so that a correspondence between a guideline setting position inputting section to be filled in by the operator and guidelines within the trimming frame with guidelines can be visually recognized; and wherein the guideline setting position inputting section includes a first set of horizontal symbols and a first set of vertical symbols assigned to the respective horizontal and vertical guidelines, and the first set of horizontal symbols and the first set of vertical symbols are identical to a second set of horizontal symbols and a second set of vertical symbols, respectively, assigned to the respective horizontal and vertical guidelines within the trimming frame on the display means;

wherein the first set of horizontal symbols are different than the first set of vertical symbols.

2. The image processing method as set forth in claim 1, wherein
in said step (a), setting guidelines at predetermined positions of the trimming frame based on a guideline dragging operation by the operator so as to provide a trimming frame with guidelines.

3. The image processing method as set forth in claim 2, wherein
in said step (a), when one guideline is dragged by the operator, another guideline is also shifted in an interlocking manner with the dragged guideline.

4. The image processing method as set forth in claim 3, wherein
in said step (a), when one guideline is dragged by the operator, another guideline is also shifted by a distance equal to a shifting distance of the dragged guideline.

5. The image processing method as set forth in claim 3, wherein
in said step (a), when one guideline is dragged by the operator, another guideline is shifted in a direction the same as or opposite to a shifting direction of the dragged guideline.

6. The image processing method as set forth in claim 1, wherein
in said step (a), setting said guidelines within a preset range of a maximum number.

7. The image processing method as set forth in claim 1, wherein
in said step (b), displaying a first display portion for displaying the trimming frame with guidelines on the processing object image in an overlapping manner along with a second display portion for displaying a region, of the processing object image, enclosed by the trimming frame with guidelines in a manner fitted in a photo frame as a print preview.

8. The image processing method as set forth in claim 1, wherein
in said step (a), preparing a new photo frame which serves also as a trimming frame based on the operator's setting operation, and setting a trimming frame with guidelines based on the prepared photo frame.

9. An image processor that trims away a processing object image displayed on display means by use of a trimming frame, comprising:
guideline setting means for setting guidelines at positions of the trimming frame based on an operator's setting operation specifying a distance between at least one guideline and a reference point so as to provide a trimming frame with guidelines; and
display control means for, while displaying the trimming frame with guidelines on the processing object image in an overlapping manner, shifting and displaying the trimming frame based on an operator's shifting operation as well as enlarging or contracting and displaying the trimming frame so as to become a similar form based on an operator's enlarging or contracting operation;
wherein the guideline setting means sets an arbitrary number of horizontal and vertical guidelines within predetermined maximum values for horizontal and vertical guidelines;
wherein the display control means displays the trimming frame with guidelines on the display means so that a correspondence between the a guideline setting position inputting section to be filled in by the operator and guidelines within the trimming frame with guidelines can be visually recognized; and
wherein the guideline setting position inputting section includes a first set of horizontal symbols and a first set of vertical symbols assigned to the respective horizontal and vertical guidelines, and the first set of horizontal symbols and the first set of vertical symbols are identical to a second set of horizontal symbols and a second set of vertical symbols, respectively, assigned to the respective horizontal and vertical guidelines within the trimming frame on the display means;
wherein the first set of horizontal symbols are different than the first set of vertical symbols.

10. The image processing method as set forth in claim 9, wherein, in said step (a), setting guidelines at predetermined positions of the trimming frame based on guideline setting positions inputted by the operator; and
wherein the guideline setting positions are set by an operator's inputting, with regard to horizontal lines and vertical lines of said guidelines, whether said horizontal or vertical lines pass through a center of the trimming frame, a distance from the center of the trimming frame that said horizontal and vertical lines pass, or a distance from sides of the trimming frame that said horizontal and vertical lines pass.

* * * * *